(12) United States Patent
Moghe (10) Patent No.: US 8,286,237 B2
(45) Date of Patent: Oct. 9, 2012

(54) METHOD AND APPARATUS TO DETECT UNAUTHORIZED INFORMATION DISCLOSURE VIA CONTENT ANOMALY DETECTION

(75) Inventor: Pratyush Moghe, Stow, MA (US)

(73) Assignee: IBM International Group B.V., Amsterdam (NL)

( * ) Notice: Subject to any disclaimer, the term of this patent is extended or adjusted under 35 U.S.C. 154(b) by 1020 days.

(21) Appl. No.: 10/780,252

(22) Filed: Feb. 17, 2004

(65) Prior Publication Data

US 2005/0091532 A1    Apr. 28, 2005

Related U.S. Application Data

(60) Provisional application No. 60/449,464, filed on Feb. 25, 2003.

(51) Int. Cl.
*G06F 11/00* (2006.01)
(52) U.S. Cl. ............................. 726/22; 726/23; 726/25
(58) Field of Classification Search ............ 726/22, 726/23, 25
See application file for complete search history.

(56) References Cited

U.S. PATENT DOCUMENTS

| | | |
|---|---|---|
| 5,623,608 A | 4/1997 | Ng |
| 6,275,941 B1 | 8/2001 | Saito et al. |
| 6,339,830 B1 | 1/2002 | See et al. |
| 6,366,956 B1 | 4/2002 | Krishnan |
| 6,460,141 B1 | 10/2002 | Olden |
| 6,618,721 B1 | 9/2003 | Lee |
| 6,904,599 B1 | 6/2005 | Cabrera et al. |
| 7,035,223 B1 | 4/2006 | Burchfiel et al. |
| 7,093,230 B2 | 8/2006 | E et al. |
| 7,113,090 B1 * | 9/2006 | Saylor et al. ............. 340/539.18 |
| 7,149,704 B2 | 12/2006 | Martin et al. |
| 7,181,488 B2 | 2/2007 | Martin et al. |
| 7,246,370 B2 | 7/2007 | Valente et al. |
| 7,266,538 B1 | 9/2007 | Shatil |
| 7,356,585 B1 | 4/2008 | Brook et al. |
| 7,415,719 B2 | 8/2008 | Moghe et al. |
| 7,437,641 B1 * | 10/2008 | Gorshe ........................ 714/732 |
| 7,467,206 B2 | 12/2008 | Moore et al. |
| 2002/0178447 A1 | 11/2002 | Plotnick et al. |
| 2003/0005326 A1 | 1/2003 | Flemming |
| 2003/0115179 A1 | 6/2003 | Prabakaran et al. |
| 2003/0149837 A1 | 8/2003 | Coker et al. |
| 2004/0049693 A1 | 3/2004 | Douglas |
| 2005/0050279 A1 | 3/2005 | Chiu et al. |
| 2005/0086534 A1 | 4/2005 | Hindawi et al. |
| 2005/0216955 A1 | 9/2005 | Wilkins et al. |
| 2006/0101511 A1 * | 5/2006 | Faillenot et al. ................ 726/13 |

(Continued)

OTHER PUBLICATIONS http://en.wikipedia.org/wiki/Anomaly-based_intrusion_detection_system, year 2007.*

(Continued)

*Primary Examiner* — David Y Jung
(74) *Attorney, Agent, or Firm* — Hamilton, Brook, Smith & Reynolds, P.C.

(57) ABSTRACT

Method and apparatus to monitor and detect anomalies of information content flows, the method comprising the steps of capturing information access packets, filtering packets to extract information, decoding packets to determine information content, deriving content signatures, trending prototypical behavior, and detecting anomalies of information access, and said apparatus comprising a computing device comprising a network based device that captures the information and produces anomaly information.

38 Claims, 4 Drawing Sheets

U.S. PATENT DOCUMENTS

| | | | |
|---|---|---|---|
| 2008/0082374 | A1 | 4/2008 | Kennis et al. |
| 2009/0165031 | A1* | 6/2009 | Li et al. .......................... 725/22 |
| 2009/0172773 | A1* | 7/2009 | Moore .............................. 726/1 |
| 2010/0011410 | A1* | 1/2010 | Liu .................................. 726/1 |

OTHER PUBLICATIONS http://www.securityfocus.com/infocus/1600, year 2002.*

Packet analysis using packet filtering and traffic monitoring techniques; Haris, S.H.C.; Ahmad, R.B.; Ghani, M.A.H.A.; Waleed, G.M.; Computer Applications and Industrial Electronics (ICCAIE), 2010 International Conference on; Publication Year: 2010 , pp. 271-275.*

Based on pattern discovery network anomaly detection algorithm; Mian Zhang; Li Zhang; Computer Science and Education (ICCSE), 2010 5th International Conference on; Publication Year: 2010 , pp. 1462-1464.*

Research on the Anomaly Discovering Algorithm of the Packet Filtering Rule Sets; Zhe Chen; Shize Guo; Rong Duan; Pervasive Computing Signal Processing and Applications (PCSPA), 2010 First International Conference on; Publication Year: 2010 , pp. 362-366.*

Lane, T., et al. "Detecting the Abnormal: Machine Learning in Computer Security", Purdue University, Purdue e-Pubs, ECE Technical Reports, Paper 74, Feb. 1, 1997.

Escamilla, T. "Intrusion Detection, Network Security Beyond the Firewall", John Wiley & Sons: New York, 1998.

LaPadula, L.J., "State of the Art in Anomaly Detection and Reaction", Mitre Report, MP99B0000020, Jul. 1999.

Forrest, S., et al. "A Computer Immunology", Communications of the ACM, 40(10):88-96, Oct. 1997.

Ko, C., et al. :"Execution Monitoring of Security-Critical Programs in Distributed Systems: A Specification-based Approach", Proceedings of the 1997 IEEE Symposium on Security and Privacy, 134-144, 1997.

Anderson, D., et al. "Next-generation Intrusion Detection Expert System (NIDES) A Summary", Technical Report SRI-CSL-97-07, SRI International, Menlo Park, CA 1995.

Javitz, H.S., et al. "The SRI IDES Statistical Anomaly Detector", Proceedings of the 1991 IEEE Symposioum on Research in Security and Privacy, May 1991. Retrieved from internet Sep. 9, 2011.

Jou, Y.F., et al. "Design and Implementation of a Scalable Intrusion Detection System for the Protection of a Network Infrastructure", Proceedings fo the DARPA Information Survivability Conference and Exposition, IEEE Computer Society, Los Alamitos, CA 2000 pp. 69-83. Retrieved from internet on Sep. 9, 2011.

Lane, T., et al. "Sequence Matching and Learning in Anomaly Detection for Computer Security", AAAI Technical Report WS-97-07, Association for the Advancement of Artificial Intelligence, AAAI. org. 1997.

Fukunaga, K., Introductoin to Statistical Pattern Recognition:, Academic Press, $2^{nd}$ Addition, 1990.

Rabiner, L. "A Tutorial on Hidden Markov Models and Selected Applications in Speech Recognition" Proceedings of the IEEE 77(2), Feb. 1989.

Steinbach, M., et al "A Comparison of Document Clustering Techniques" Technical Report #00-034, University of Minnesota, Depart of Computer Science and Engineering, 2000.

Lippman, R.P., et al. "Evaluating Intrusion Detection Systems: the 1998 DARPA off-line detection evaluation" Proceedings fo the DARPA Information Survivability Conference and Exposition, IEEE Computer Society, Los Alamitaos, CA Jan. 2000.

International Preliminary Report on Patentability of PCT/US2004/031385 dated Aug. 22, 2006.

International Preliminary Report on Patentability of PCT/US2010/030242 dated Oct. 11, 2011.

International Search Report of PCT/US2004/031385 dated Jul. 12, 2006.

International Search Report of PCT/US2010/030242 dated Dec. 13, 2010.

Written Opinion of the International Searching Authority of PCT/US2004/031385 dated Jul. 12, 2006.

Written Opinion of the International Searching Authority of PCT/US2010/030242 dated Dec. 13, 2010.

* cited by examiner

METHOD AND APPARATUS TO DETECT UNAUTHORIZED INFORMATION DISCLOSURE VIA CONTENT ANOMALY DETECTION

RELATED APPLICATION

This application is based on and claims priority and benefit of provisional U.S. Patent Application Ser. No. 60/449,464, filed Feb. 25, 2003.

FIELD OF THE INVENTION

The present invention relates generally to auditing information access on computing devices, and more particularly, to an apparatus and method to monitor and detect anomalies of information content flows.

BACKGROUND OF THE INVENTION

The invention is based on the experience that within an organization, the content information flows, especially involving critical, day-to-day, work-related information, has certain "stickiness" properties. Stickiness comes from:
1. Content with time—critical information (or at least its marker) does not change frequently, and should have high correlation with time.
2. Content with user—users consume and communication information content related to their "domain" expertise and role within the organization. The domain expertise and role within the organization does not change frequently, and as such content should be strongly correlated with the user.

The property of content stickiness can be characterized and trended for specific organizations and communities of users, content, and networks. We believe that trending can lead to a development of a "prototypical" or "normal" behavioral model of content communication. We further believe that any anomalies within this model point to potential information security problems. For instance, an anomaly can point to an instance of unauthorized disclosure of critical information. Additionally, certain types of anomalies can be rare content events, which can point to "critical" information that must be strongly secured.

The current invention captures the above idea via a content monitoring, analysis, and anomaly detection system. The system as described here is a software-based appliance, which can filter network traffic, re-constitute content messages, and carry out analysis and anomaly detection. Without loss of generality, the key intellectual property within this appliance is the idea of correlating content, users, time, and space, and developing trends and detecting anomalies at the information layer. This intellectual property is equally applicable in different implementations; such as to detect anomalies in database retrievals, or for software-based anomaly detection within specific applications such as for content scanning email systems, or alternatively for software-based anomaly detection for stored data content on PCs and laptops etc. A reasonable practitioner in the field of security and software should be able to construct these implementations based on the information provided in this document.

SUMMARY OF THE INVENTION

We describe the invention of a new method and apparatus to monitor and detect anomalies of information content flows. The invention can be applied to monitor flow of information content across any network or within any application. The invention is unique in two respects—
1. Technology: Monitoring and analysis is based on trending and anomaly detection at the information or content-level. There have been earlier applications of anomaly detection, but for lower-level activities such as intrusion detection (network-layer or system-layer), or for specific application activity monitoring such as transaction monitoring (credit cards). Information content layer activities are much broader and complex than network-layer or system-layer activities.
2. Application: The current invention has several unique risk assessment applications in the information content security arena.
   a. Unauthorized Information Disclosure: The invention can detect anomalies based on correlation of information flow, users, and time. These anomalies can be used to discover "unauthorized information disclosures" from confidential information repositories, without requiring to know the specific type of information being disclosed.
   b. Content Usage Analysis: The invention can analyze content usage and classify content based on rare information exchanges versus common and widely shared information exchanges. This can lead to discovery of "critical" information assets within the organization.

DETAILED DESCRIPTION OF THE INVENTION

We describe the invention of a new method and apparatus to monitor and detect anomalies of information content flows. The invention can be applied to monitor flow of information content across any network or within any application. The invention is unique in two respects—
1. Technology: Monitoring and analysis is based on trending and anomaly detection at the information or content-level. There have been earlier applications of anomaly detection, but for lower-level activities such as intrusion detection (network-layer or system-layer), or for specific application activity monitoring such as transaction monitoring (credit cards). Information content layer activities are much broader and complex than network-layer or system-layer activities.
2. Application: The current invention has several unique risk assessment applications in the information content security arena.
   a. Unauthorized Information Disclosure: The invention can detect anomalies based on correlation of information flow, users, and time. These anomalies can be used to discover "unauthorized information disclosures" from confidential information repositories, without requiring to know the specific type of information being disclosed.

b. Content Usage Analysis: The invention can analyze content usage and classify content based on rare information exchanges versus common and widely shared information exchanges. This can lead to discovery of "critical" information assets within the organization.

Next, we describe the details of the invention. We believe that these details are adequate for a practitioner, skilled in the art, to develop an information assessment apparatus.

Prior Art

Classically, intrusion detection has been approached by classifying mis-use (via attack signatures)[Escamilla, Lippman et al] or via anomaly detection. [LaPadula] provides a good summary of various intrusion detection techniques in the literature. Various techniques used for anomaly detection include using strings[Forrest et al.], logic-based[Ko et al.], or rule-based [Anderson et al.].

A classical statistical anomaly detection system proposed to address network and system-level intrusion detection is presented in IDES/NIDES[Javitz, Jou]. In general, statistical techniques overcome the problems with the declarative problems logic or rule-based anomaly detection techniques.

Traditional use of anomaly detection of accesses is based on comparing sequence of accesses to historical "learnt" sequences. Significant deviations in similarity from normal learnt sequences can be classified as anomalies. Typical similarity measures are based on threshold-based comparators (such as the ones used in [Lane97, Lane]), non-parametric clustering classification techniques such as Parzen windows [Fukunaga90], or Hidden Markov models [Rabiner90].

Our problem of content-based anomaly detection has a unique challenge in that the content set itself can changes with time, thus reducing the effectiveness of such similarity-based learning approaches. Instead we propose the use of higher-level behavioral models (e.g., memory) to classify between anomalies and legitimate access to information.

Invention Description

Figure 1:
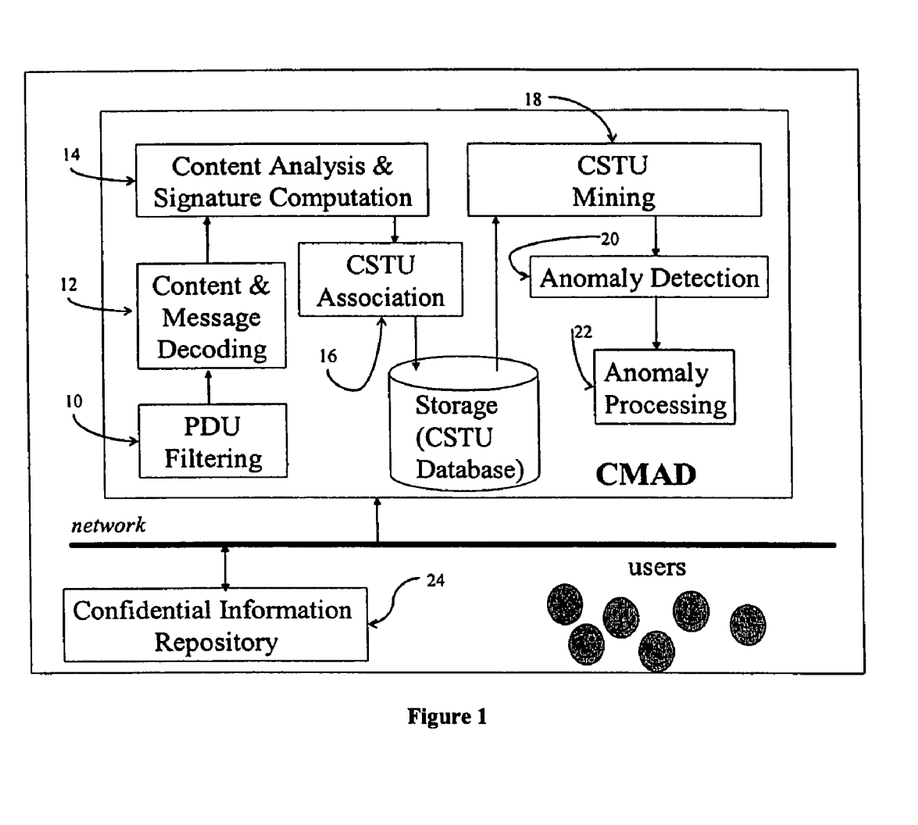
FIG. 1 illustrates the basic architecture of Content Monitoring and Anomaly Detection invention (CMAD).

The basic architecture of the invention is indicated in FIG. 1. For brevity, we will refer to the invention as CMAD (Content Monitoring and Anomaly Detection). The CMAD as described is a software-based appliance installed on a network.

We will describe each module separately—

1. PDU Filtering—The PDU Filtering module 10 inspects each packet on the network in a promiscuous mode. CMAAD is assumed to be installed as a tap on the network. The packets are filtered based on a variety of layer 2 through layer 7 protocols. Only meaningful packets representing "information content" are retained. Packets representing information content are indicated by protocols and applications of interest, such as document application (e.g., Notes, Documentum, Word, etc.), data-base access protocol (e.g., SQL—both queries and retrievals), application protocols (e.g., smtp, telnet, ftp, rcp, http, etc.), and certain file systems protocols. Packets that do not meet with these criteria are discarded.

2. Content and Message Decoding—The content and message decoding module 12 in FIG. 1 decodes the packets based on knowledge and semantics of the specific application or protocol, and the type of encoding used by the application. For instance, if this document were to be accessed across the network by a Word Application, the module would be able to decode the "text" words within this document as it was loaded across the network where the invention was installed.

Alternatively, if this document were to be emailed to an email client within the enterprise, the module would be able to decode the "text" words within world document, as part of an attachment to an SMTP message. Further, the module notes the delineation of new message boundaries, so that decoded content text words can be classified into their respective messages.

3. Content Analysis and Signature Computation—The content analysis and signature computation module 14 in FIG. 1 first achieves real-time mapping of message words into a content distribution vector (called CDV). The CDV is a quantitative representation of the content message that seeks to retain the information theoretic value of the content. One candidate method for deriving CDV is based on creating a frequency-based distribution of the key text words in the message. The module further derives a compact statistical signature from the content distribution vector, called a Content Signature. The content signature summarizes the content using numeric values. The key advantages of deriving a content signature is that profiling and anomaly detection can be done on the basis of statistical analysis of content signatures.

Figure 2:
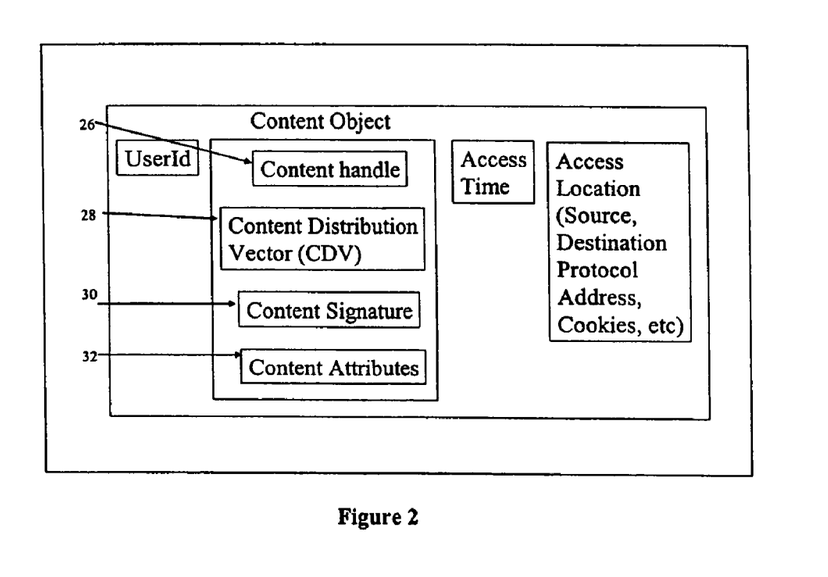
FIG. 2 illustrates the high-level schema of CSTU Database.

4. CSTU Association and Storage—The CSTU association and storage module 16 in FIG. 1 stores the content, along with the user identity from the message payload, time, and location (source and destination IP addresses of the PDU) into a database called the CSTU Database. (CSTU stands for the associated combination of content, space, time, and user). The complete content object as stored internally is made up of three types of sub-fields—Content Handle, Content Distribution Vector, Content Signature and additional content attributes. The high-level schema of the CSTU database is shown in FIG. 2. Examples of content handle 26 in FIG. 2 can include the specific file name of the content, or the request query string that will result in the actual content as a response in a database transaction. The content distribution vector 28 in FIG. 2 and the content signatures 30 in FIG. 2 have already been described above. The content object can also include additional content attributes 32 in FIG. 2, which can be used for anomaly processing and additional reporting purposes. These attributes can include the content type (e.g., excel document vs. word document), content length (bytes for example), content hash (unique representation of the content), content encoding information, content properties (including ownership if relevant, time of creation, read/write/execute permissions, and encryption, password protection status).

5. CSTU Mining—The CSTU Mining module 18 in FIG. 1 periodically examines CSTU database and derives the "prototypical" model of content, users, and time. The specific technique used for CSTU Mining is based on statistical clustering, filtering, and distance-based metrics. Alternative machine learning techniques can also be used for CSTU Mining, such as neural networks or rule-based expert systems. The CSTU table information is periodically deleted (aged) from the database as configured by the administrator. The aging period is also called "averaging interval" and typically is on the order of several days depending on the nature of the mining algorithm, the organization, type of information being monitored, users, etc.

6. Anomaly Detection—The Anomaly Detection module 20 in FIG. 1 detects "strong" deviations from the prototypical model established by the CSTU Mining module. Strong deviations are characterized by anomaly detection rules on various combinations of user, content, location, time entities. Any anomalies are diverted to Anomaly Processing module for further filtering and processing.

7. Anomaly Processing—The objective of the Anomaly Processing module 20 in FIG. 1 is to filter the anomalies so as to minimize "false alarms" and increase the "precision" of anomalies. The Anomaly Processing achieves this using a variety of techniques including:
   a. Positive correlation with past security violation events
   b. Negative correlation with past false alarms or non-events The output of the Anomaly Processing modules is a report listing the anomalies, their corresponding content signatures, content handles, user ids, access time and location. This report should be comprehensive enough for security administrators to investigate the root cause behind the content anomalies. Consistent anomalies that are detected close to 100% with low false alarms can be eventually classified by "pattern" of misuse. Such anomalies can be detected in real-time, leading to a variety of responses, including real-time alerts, request of additional validation, or denial of access.

Content Analysis and Signature Computation

Figure 3:
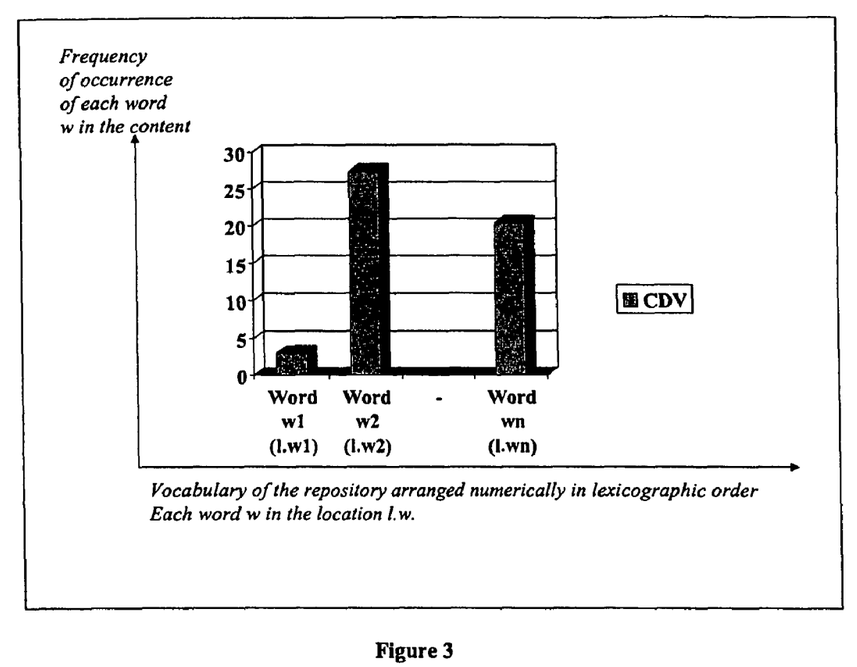
FIG. 3 illustrates sample content distribution vector (CDV) for content.

Our content analysis method first involves mapping the content into a Content Distribution Vector (CDV). The CDV represents the frequency of each word in the content. Each word in the CDV occupies a location corresponding to its lexicographic location within the vocabulary of the enterprise. FIG. 3 illustrates a sample CDV of content.

The next step is to represent the CDV and the content with a compact content signature. A content signature should have the following properties:
1. uniqueness—content signatures should be able to uniquely represent a certain content
2. clustering property—content signatures should be able to "aggregate" similar content
3. ordering property—content signatures should allow simple "distance" or "ordering" operations
4. computational property—content signatures should afford easy real-time computation Our approach of anomaly detection for unauthorized disclosures does not itself depend on the choice of the content signatures, so we will simply outline a set of candidate content signatures. Depending on the application, the choice of one versus the other may be more appropriate. One candidate is based on moment statistics: content signatures could be simply the n-dimensional moment statistic of the CDV. Thus, a 2-dimensional content signature would consist of the mean of the CDV, and the standard deviation of the CDV. Another candidate is simply the use of "hash" to convert content into a number. (Hash may offer semi-uniqueness, but does not offer ordering or clustering required in the list above). Alternative candidates are the use of document clustering techniques (such as described in [Steinbech et al.], including K-means based clustering and agglomerative hierarchical clustering) where all the documents that classify into one cluster share the same (or very similar) content signatures. In general, the idea behind content signatures is to permit clustering of documents based on their content.

CSTU Mining

The CSTU Mining framework is based on establishing a relationship between various entities including content, user, location, and time. In this invention, we use a statistical approach to develop relationship between these entities. We assume that these entities are stored in a relational form in the CSTU database. The CSTU Mining algorithm examines the CSTU database by analyzing the relationships and creating a statistical profile of the entities in three derived tables.

6.1 User Content Signature Frequency Distribution Table (UCSFD)

Figure 4:
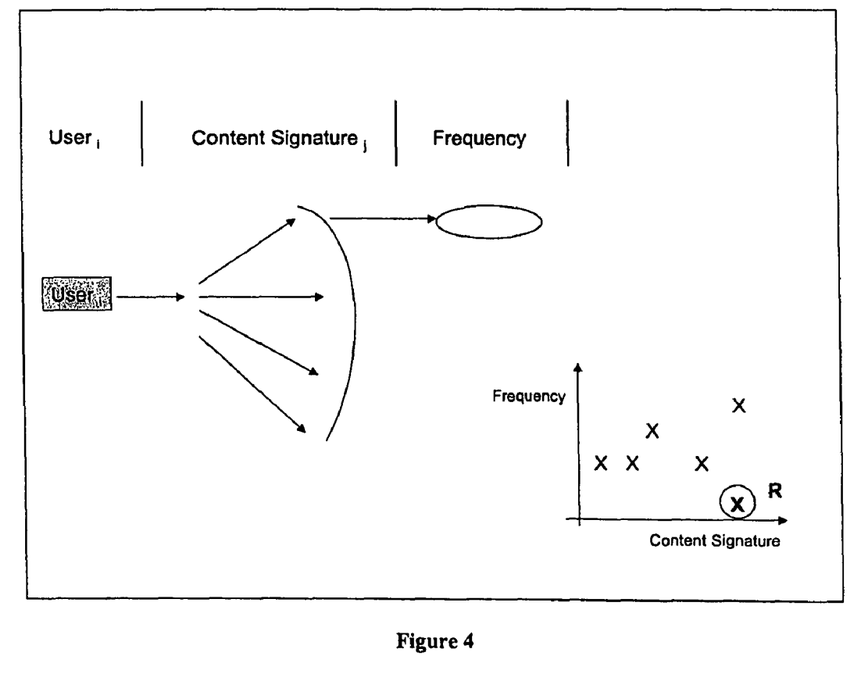
FIG. 4 illustrates User Content Signature Frequency Distribution table

FIG. 4 illustrates the UCSFD, and should be self-explanatory. The UCSFD can help construct a frequency view of all the content signatures accessed by a user.

6.2 User Content Signature Time Distribution Table (UCSTD)

Figure 5:
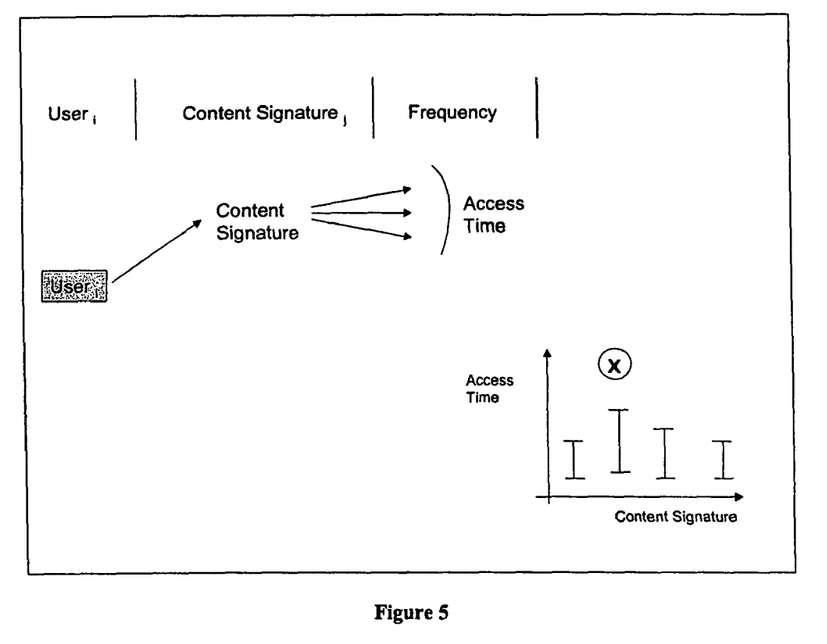
FIG. 5 illustrates User Content Signature Time Distribution table

FIG. 5 illustrates the UCSTD, and indicates how it can help construct a time distribution of all the content accesses by a user.

6.3 User Content Signature Location Distribution Table (UCSLD)

Figure 6:
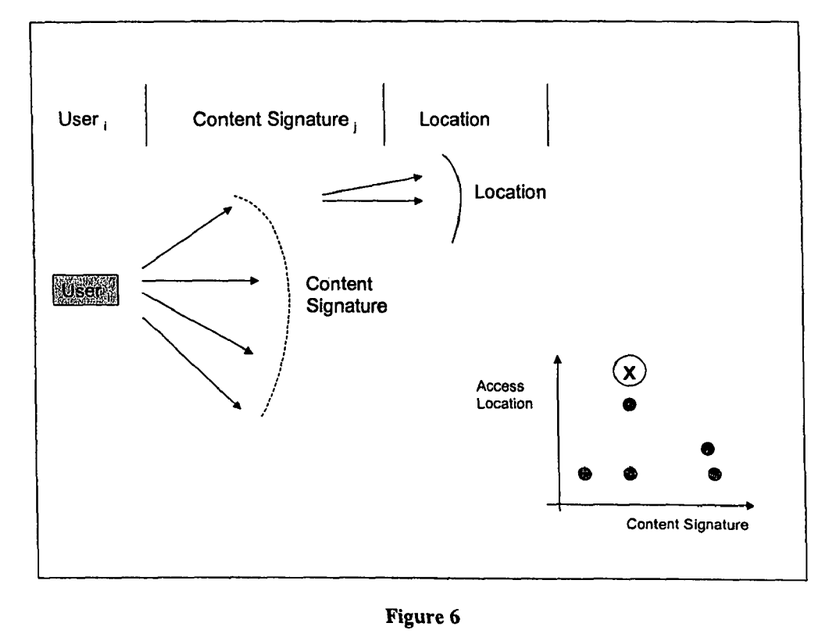
FIG. 6 illustrates User Content Signature Location Distribution table

FIG. 6 illustrates the UCSLD, and shows how it can help construct the location distribution all the content accesses by a user.

CSTU Anomaly Detection

Figure 7:
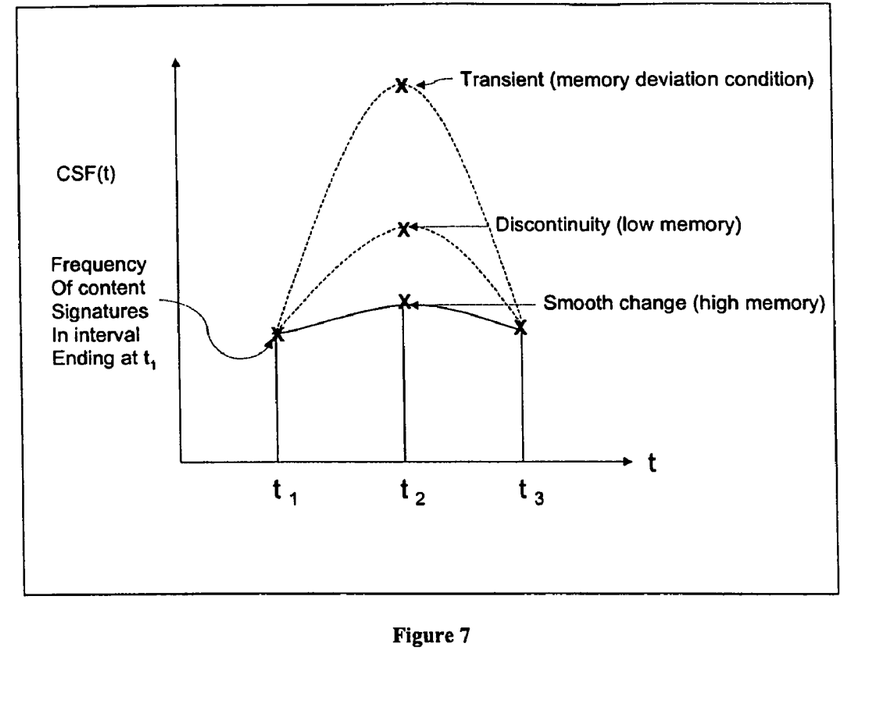
FIG. 7 illustrates Content Signature Frequence Process

The CSTU Anomaly Detection framework expresses anomalies in terms of the behavioral relationships of entities such as content, users, time, and location. To devise these relationships, we will define four deviation conditions that are helpful to detect anomalies. The four deviation conditions are as following:

1. Memory Deviation Condition:
   Usually, authorized access of confidential information revolves around a small set of content relevant to a user's role within an organization. As organizational roles change, projects change, leading to change in activities and subsequently a change in their corresponding content signatures. However, even in cases with these changes, it is expected that a legitimate (authorized) information access by users will have some correlation with time. This correlation is also referred to as memory.
   The memory deviation condition seeks to capture information access that does not exhibit "expected" level of memory. Such deviants are also referred to as content transients.
   A memory deviation condition is captured by determining for every user, and for each piece of content, the time evolution of the variable representing the frequency of content signature across each averaging interval. This evolution is referred to as the Content Signature Frequency process, CSF(t), in FIG. 7. A transient in this variable represents a memory deviation condition. FIG. 7 shows a transient.
   Algorithmically, a transient can be captured by determining the second derivative (or equivalent discrete computation) of the variable representing the frequency of content signature. If the second derivative is an outlier[1], that is exceeds a certain memory deviation threshold MDT, a transient is declared.

[1]Our approach of identifying outliers is based on distance-based thresholding. Threshold can be accomplished in any number of commonly known techniques—an example is setting threshold at mean ±K.σ, where mean is the sample mean of the measurements, σ is the sample standard deviation, and K is an integer threshold parameter designed around the distribution of the measurement. Outlier conditions can be identified on a level-basis (i.e. crossing the threshold), or on a smoothing majority window-basis (i.e. crossing level X out of Y times in a sequence), or other alternative formulations.

Rule: If for content $CS^i$,
   at time $t=t2$, $d^2CSF^i(t)dt^2 > MDT$,
   then a memory deviation is said to occur at time t2.

2. Rare Content Condition:
   Usually, the authorized access of confidential information revolves around frequent access of a small set of content relevant to a user's role within an organization. Thus, any information content that is rarely accessed (especially combined with other deviation conditions) can be a good candidate to lead to a potential unauthorized disclosure activity.

A rare content condition is captured by examining the User Content Signature Frequency Distribution Table for each user. A rare occurrence within this table is a rare content condition. FIG. 4 shows a rare content condition as marked by the alphabet R.

Algorithmically, a rare content condition can be captured by if the frequency of any content signatures falls below expected threshold of access frequency AFT over the averaging interval.

Rule: If for user i, and content j, $UCSFD^{ij}$<AFT, then the user i's access of content j qualifies as a rare content condition.

3. Time Deviation Condition:

We expect usual authorized access of confidential information to be around fairly predictable times of access, specific to a user, and users' role within the organization Any strong deviation from the historical time of access can be a good candidate to lead to a potential unauthorized disclosure activity.

A time deviation condition is detected by examining the user content time access distribution for each user. Any outliers on this distribution point to time deviations. Standard statistical metrics can be used to quantify outliers. FIG. 5 illustrates an example of a time deviation condition.

Rule: If for user i, $UCSTD^{ij}$ is an outlier, the user i's access of content j qualifies as a time deviation condition.

4. Location Deviation Condition:

We expect usual authorized access of confidential information to be around fairly predictable[2] locations of access, specific to a user, and users' role within the organization. Location can be quantified by the combination of source and destination protocol addresses (such as IP addresses) contained within the content messages. Any strong deviation from the historical addresses of access can be a good candidate to lead to a potential unauthorized disclosure activity.

[2] The assumption is that even with dynamic IP address protocols such as DHCP, the typical IP addresses of desktops remain fairly static. If this is not the case, additional mechanisms such as cookies can be used to detect persistence of a specific user machine.

A location deviation condition is detected by examining the user content location access distribution for each user. Any outliers on this distribution point to location deviations. Standard statistical metrics can be used to quantify outliers. FIG. 6 illustrates an example of a location deviation condition.

Rule: If for user i, $UCSLD^{ij}$ is an outlier, the user i's access of content j qualifies as a location deviation condition.

The foregoing merely illustrates the principles of the present invention. Those skilled in the art will be able to device various modifications, which although not explicitly described or shown herein, embody the principles of the invention and are thus within its spirit and scope.

The above mentioned invention has been implemented in a specific embodiment. One instance of definition of criticality information 72 on the IAM is by means of a graphical user interface, as shown in FIG. 4. The IAA is implemented on user computers and generates results that are uploaded to the IAM. FIG. 5 shows one embodiment of the results when uploaded to the IAM and viewed by the graphical user interface on the IAM.

FIG. 5(a) 74 shows the color coded organization level critical information, 5(b) 76 shows the distribution of critical information, 5(c) 78 shows the distribution of critical information at a computer level, and 5(d) 80 shows the details of critical information collected from a specific IAA.

REFERENCES

1. Escamilla T., Intrusion Detection: Network Security Beyond the Firewall, John Wiley & Sons: New York, 1998.
2. Lippman R, et al., "Evaluating intrusion detection systems: The 1998 DARPA off-line intrusion detection evaluation", *Proceedings of the DARPA Information Survivability Conference and Exposition*, January 2000, IEEE Computer Society, Los Alamitos, Calif. 2000, 12-26.
3. LaPadula L. J., "State of the Art in Anomaly Detection and Reaction", *MITRE Report*, MP 99B0000020, July 1999.
4. Forrest S., et al., "A Computer immunology", *Communications of the ACM* 1997, 40(10):88-96.
5. Ko C., et al., "Execution Monitoring of security-critical programs in distributed systems: A specification-based approach", *Proceedings of the* 1997 *IEEE Symposium on Security and Privacy,* 1997, 134-144.
6. Anderson D, et al., "A Next-generation intrusion detection expert system (NIDES): A summary", *Technical Report SRI-CSL*-97-07, SRI International, Menlo Park, Calif., May 1995.
7. Javitz H S, Valdez A., "*The SRI statistical anomaly detector*", Proceedings of the 1991 IEEE Symposium on Research in Security and Privacy. May 1991
8. Jou Y, Gong F, Sargor C, Wu X, Wu S, Chang H, Wang F, "*Design and implementation of a scalable intrusion detection system for the protection of network infrastructure*", Proceedings of the DARPA Information Survivability Conference and Exposition, IEEE Computer Society, Los Alamitos, Calif., 2000, pp 69-83.
9. Lane, T. and Brodley, C. E., "Detecting the abnormal: Machine learning in computer security", *TR-ECE*-97-1, West Lafayette, Ind., Purdue University.
10. Lane, T. and Brodley, C. E., "Sequence Matching and Learning in Anomaly Detection for Computer Security", 1997, West Lafayette, Ind., Purdue University.
11. Fukunaga, K. "Statistical Pattern Recognition", Academic Press, Second Edition, 1990.
12. Rabiner, L. R., "A Tutorial on Hidden Markov Models and selected applications in speech recognition", *Proceedings of the IEEE,* 1989.
13. Steinbach, M., et al. "A Comparison of Document Clustering Techniques", Technical Report #00-034, University of Minnesota, Department of Computer Science and Engineering.

What is claimed is:

1. A method of performing an application layer semantic analysis to detect information access anomalies, comprising:
   a) capturing data packets;
   b) filtering the captured data packets to detect information content;
   c) processing packets based on semantics of an application or protocol;
   d) generating a quantitative representation;

e) deriving a content signature from the quantitative representation;
f) deriving a prototypical model that includes a frequency view of a set of content signatures accessed by a given user, where the set of content signatures are indicative of content that is changing over time; and
g) detecting an application layer information access anomaly by using a semantic analysis to detect a given deviation from the prototypical model.

2. The method, according to claim 1, where the prototypical model also includes a time distribution of a set of content accesses by the given user.

3. The method, according to claim 1, where the prototypical model also includes a location distribution of a set of content accesses by the given user.

4. The method, according to claim 1, where the quantitative representation is captured as a content distribution vector that captures a frequency based distribution of key words in the message.

5. The method, according to claim 1, where the content signature is computed based on a moment statistic.

6. The method, according to claim 1, where the content signature is computed as a hash of the information content.

7. The method, according to claim 1, where the content signature is computed via a document clustering technique where documents that share content signatures are classified together.

8. The method, according to claim 1, further including storing the information content, the content signature, and one or more attributes, where the attributes include one of: user identity, location of access, time of access, content type, content length, content hash, content encoding, and one or more content properties.

9. The method, according to claim 1, where mining is based on statistical clustering and distance based metrics.

10. The method, according to claim 9, where a statistical metric includes frequency of all content signatures accessed by a user.

11. The method, according to claim 9, where a statistical metric includes time of all content signatures accessed by a user.

12. The method, according to claim 9, where a statistical metric includes location of all content signatures accessed by a user.

13. The method, according to claim 1, where the prototypical model is derived by mining a content database.

14. The method, according to claim 1, where mining may be augmented by content aging, where information is periodically deleted from the content database.

15. The method, according to claim 14, where content aging is a function of a mining algorithm and a type of information being monitored.

16. The method, according to claim 1, where the information access anomaly is based on a given user accessing given content from a given location at a given time.

17. The method, according to claim 16, where the information access anomaly is detected by a memory-based deviation where the given content accessed by the given user shows a deviation over normal content accessed.

18. The method, according to claim 16, where the information access anomaly is detected by a rare content condition, where the given user accesses given content that is rarely accessed by the given user.

19. The method, according to claim 16, where the information access anomaly is detected by a time deviation where the given user accesses the given content at a time different from historical access by the given user.

20. The method, according to claim 16, where the information access anomaly is detected by a location deviation where the given user accesses the given content from a location different from historical access by the given user.

21. The method, according to claim 1, further including processing the information access anomaly.

22. The method, according to claim 21, where processing the information access anomaly processing includes one of: positive correlation with at least one past security violation event, and negative correlation with a past false alarm or non-event.

23. The method, according to claim 1, where a set of consistent anomalies are classified into a pattern of misuse.

24. The method, according to claim 1, where the information access anomaly is detected in real-time.

25. The method, according to claim 1, where information access anomaly detection is used for real-time protection of information.

26. The method, according to claim 25, where real-time anomaly detection is used for protection via real-time alerts.

27. The method, according to claim 25, where real-time anomaly detection is used for real-time protection via denial of access.

28. The method, according to claim 25, where real-time anomaly detection is used for real-time protection via additional user validation.

29. The method as described in claim 1, where the data packets are associated with access to a confidential information repository.

30. The method of claim 1 wherein the application layer semantic analysis examines an entirety of an application layer without any application-specific limits.

31. Apparatus, comprising:
a processor; and
a computer memory storing program instructions that when executed by the processor perform a method of detecting an information access anomaly, the method comprising:
monitoring data packets indicative of changing content over time;
generating a prototypical model; and
performing a semantic analysis against the prototypical model to identify an application level information access anomaly.

32. The apparatus as described in claim 31 wherein the detecting method examines an entirely of an application layer without any application-specific limits.

33. The apparatus of claim 31, implemented on a computing device and connected on a network as a passive tap.

34. The apparatus of claim 31, implemented as a network appliance that derives information transparently.

35. The apparatus of claim 31, implemented on an end-user computing device.

36. The apparatus of claim 31, implemented as a shim on an application server.

37. The apparatus of claim 31, connected to an access control system to enable real-time monitoring of anomalous information access.

38. The apparatus of claim 31, configured to implement one or more compliance policies.

* * * * *